United States Patent Office

2,794,052
Patented May 28, 1957

---

2,794,052

PROCESS FOR THE PREPARATION OF DIACYL RESORCINOLS

David A. Gordon and Robert L. Hudson, Midland, Mich., assignors to The Dow Chemical Company, Midland, Mich., a corporation of Delaware No Drawing. Application February 2, 1956,
Serial No. 562,919

3 Claims. (Cl. 260—591)

This invention relates to a new process for preparing diacyl resorcinols. More particularly, it relates to a process for preparing the 4,6-diacyl resorcinol isomer in preference to the 2,4-isomer.

For purposes of this application the term acyl is meant to include only organic acyl groups.

Diacyl resorcinols, particularly the dibenzoyl resorcinols, have been found to be effective light stabilizers for haloethylene polymers, as disclosed in copending application of C. B. Havens, U. S. Serial No. 499,757. However, some isomers have been found to be more suitable for stabilizers than the other isomers. For example, the prior process for producing dibenzoyl resorcinol comprised the reaction of resorcinol with benzoyl chloride. That process resulted in a mixture of from 90 to 95 percent of 2,4-dibenzoyl resorcinol and from 10 to 5 percent of 4,6-dibenzoyl resorcinol. The 2,4-isomer is yellow and consequently white formulations could not be produced using it as a stabilizer. The 4,6-isomer is white and allows the production of white formulations. The prior means of obtaining the 4,6-isomer was a costly and time-consuming extraction and fractional crystallization of the above-defined mixture. It would be most desirable if a process could be found which would prepare the 4,6-isomer in pure form eliminating the necessity of such an extraction.

It is accordingly the principal object of this invention to prepare 4,6-diacyl resorcinols which are substantially free of the 2,4-isomer.

It is a further object to provide a process whereby 4,6-diacyl resorcinols may be easily obtained in high yields and pure form by direct chemical reaction.

The above and related objects are achieved by means of a process whereby a resorcinol dialkyl ether is caused to react with an acyl chloride in the presence of aluminum chloride at a temperature such that the ether will not be cleaved and following completion of the reaction raising the temperature until the ether is cleaved. By this process a product consisting of 4,6-diacyl resorcinol which is substantially free of the 2,4-isomer is prepared.

It is known that when resorcinol is disubstituted with acyl groups, the first acyl group enters the 4 position followed by the introduction of the second acyl group into the 2 or 6 positions. The reason for such a mechanism is believed to be due to steric hindrance. However, if steric hindrance factors alone determined the introduction of the second acyl group, that group should be expected to enter the 6 position preferentially to the 2 position. Such a mechanism is not justified by the results of such an acylation, since the product produced is principally the 2,4-isomer. Although the inventors do not wish to be limited to any particular theory, they believe that the second acyl group enters preferentially into the 2 position because of the formation of a chelated structure between the hydroxyl and carbonyl functions making the 2 position more receptive for substitution than the 6 position.

In the process of this invention such a chelated structure is not possible if the ethers that are employed in the process are those ethers of resorcinol with bulky etherifying groups which will prevent chelation between an ether group and a carbonyl group in an ortho position to that ether group. The alkyl ethers, particularly the lower alkyl ethers, are preferred since they are either readily available or are easily prepared if desired. Typical examples of useful compounds are resorcinol dimethyl ether and resorcinol diethyl ether.

The reaction must be carried out at a temperature at which the ether groups will not be cleaved until diacylation in the 4 and 6 positions is complete. Following completion of the diacylation of the ether groups of the 4,6-diacyl resorcinol dialkyl ether must be cleaved to obtain the desired 4,6-diacyl resorcinol. The complete reaction may be conducted at room temperature. However, that requires unnecessarily long periods of time to complete the process, particularly to cleave all of the ether groups. It is therefore preferred to carry out the process on a temperature schedule in which the diacylation is completed at a temperature below 50° C. and subsequently cleaving the ethers at a temperature of about 80° C. Such a temperature schedule assures a complete reaction in a relatively short time. Although the temperatures employed may be varied within relatively wide limits, a trained investigator will be able to determine the optimum temperatures by simple preliminary experiments.

The overall yield of 4,6-diacyl resorcinol based on the reactants may not be high due to the great number of side reactions. However, the main advantage of this process over prior processes is that all of the by-products from such side reactions are easily separated from the 4,6-diacyl resorcinol by simple laboratory procedures. All of the organic by-products are soluble in common organic solvents, such as methanol, in which the 4,6-diacyl resorcinol is insoluble. The crude product therefore need only be washed with such a solvent or stirred into such a solvent and filtered. Typical examples of some of the by-products are the 4-monoacyl resorcinol, certain esters, and the monoalkyl ethers of the 4,6-diacyl resorcinol.

The reaction may be most conveniently conducted in any typical Friedel-Crafts solvent such as methylene chloride, mono- and di-chlorobenzene, or 1,1,2,2-tetrachloroethane.

By way of example, resorcinol dimethyl ether was added at room temperature with stirring to a mixture of benzoyl chloride and aluminum chloride in 1,1,2,2-tetrachloroethane. The reaction mixture was allowed to react overnight at room temperature with stirring. The temperature of the reaction mixture was then slowly raised to 80° C. and maintained at 80° C. for one hour. The mixture was quenched in cold, dilute HCl, heated to break up the AlCl$_3$ complex, and the organic layer separated and washed with water. The organic layer was concentrated by the removal of the solvent, and the 4,6-dibenzoyl resorcinol recrystallized from methanol. The structure was proved by means of mixed melting points and by intra red absorption techniques.

By way of contrast when resorcinol was employed in the above process in place of the dimethyl ether the resulting product consisted of 90 percent of the 2,4-isomer and 10 percent of the 4,6-isomer.

When the process was again repeated using the dimethyl ether but employing an initial reaction temperature of 80° C. the product was predominantly the 2,4-isomer.

The process was repeated using either p-t-butyl benzoyl chloride, acetyl chloride, or o-chlorobenzoyl chloride in place of the benzoyl chloride. In all cases the only diacyl resorcinol derivative isolated was the 4,6-isomer.

We claim:
1. A process for preparing 4,6-diacyl resorcinols substantially free from the 2,4-isomer, comprising subjecting a resorcinol dialkyl ether to the action of an acyl chloride and aluminum chloride at a first temperature at which said ether is not cleaved until at least two acyl groups have been substituted in the resorcinol nucleus, and thereafter raising the temperature to one at which said ether linkages are cleaved, to produce 4,6-diacyl resorcinol.

2. The process claimed in claim 1, wherein the resorcinol dialkyl ether is resorcinol dimethyl ether.

3. The process claimed in claim 1, wherein the acyl chloride is benzoyl chloride.

No references cited.